Figure 5:
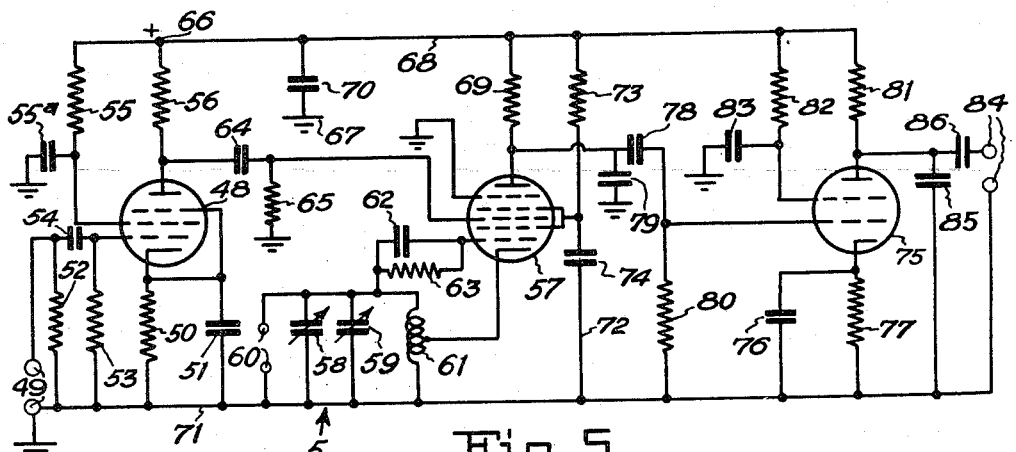

Aug. 22, 1950     P. H. WEISS     2,519,421
APPARATUS FOR MEASURING BLAST PRESSURES
Filed July 23, 1945     4 Sheets—Sheet 1
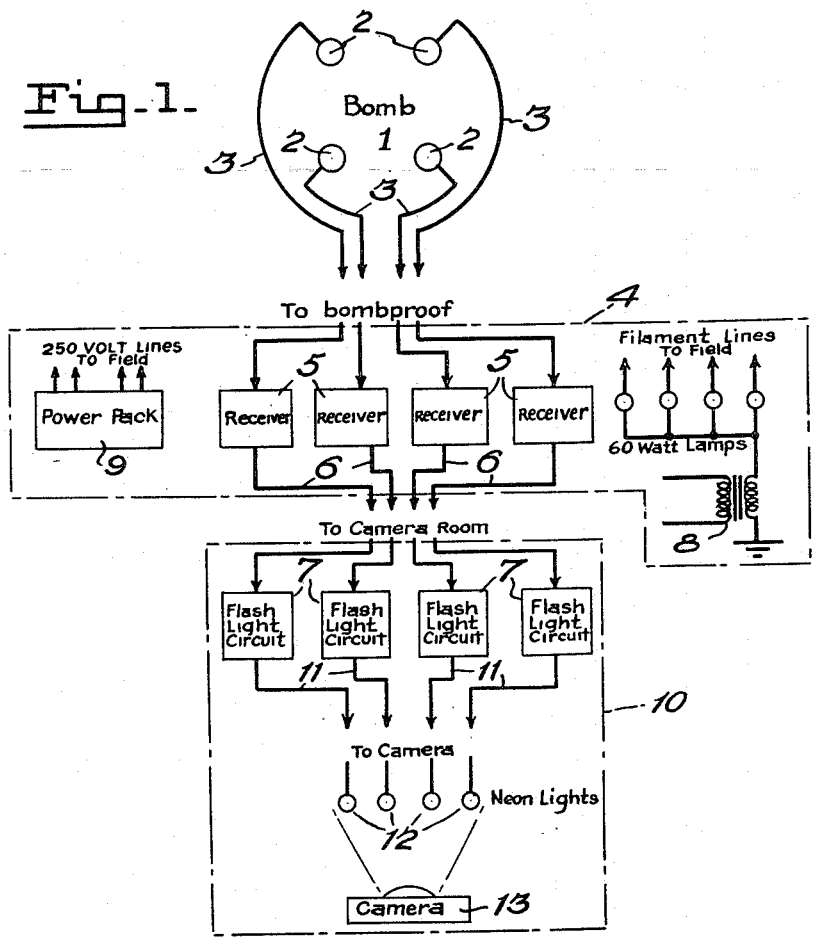
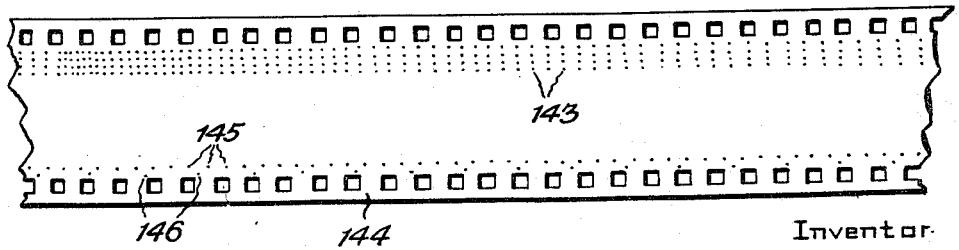
Inventor
Phil H. Weiss
By J. H. Church & H. E. Thibodeau
Attorneys Aug. 22, 1950        P. H. WEISS        2,519,421
APPARATUS FOR MEASURING BLAST PRESSURES
Filed July 23, 1945        4 Sheets-Sheet 2
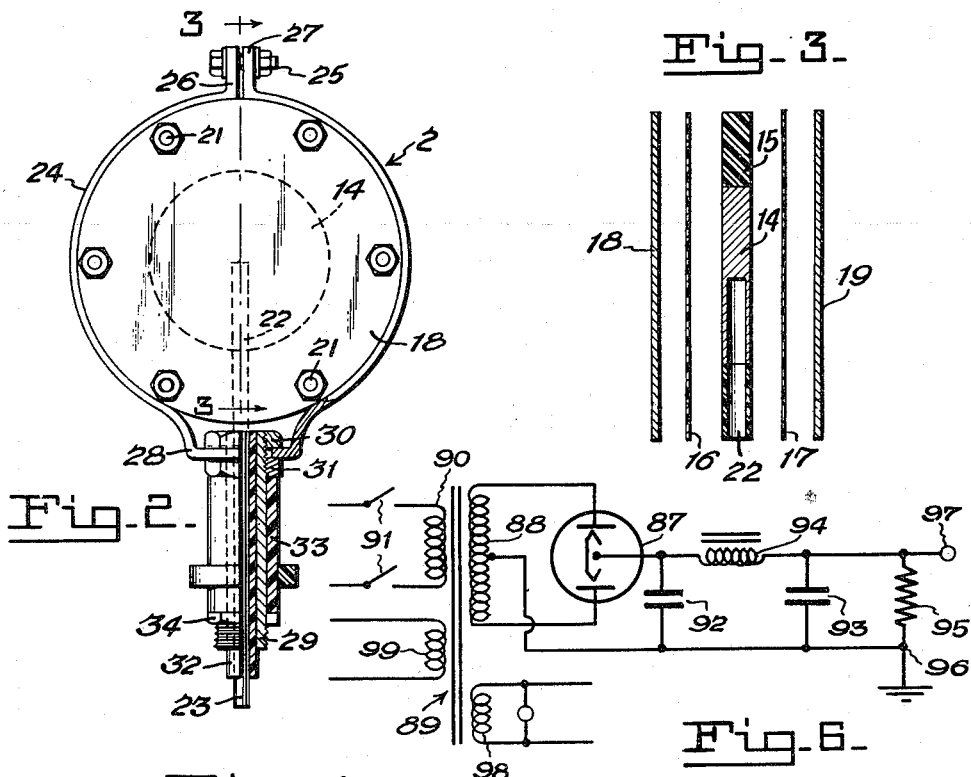
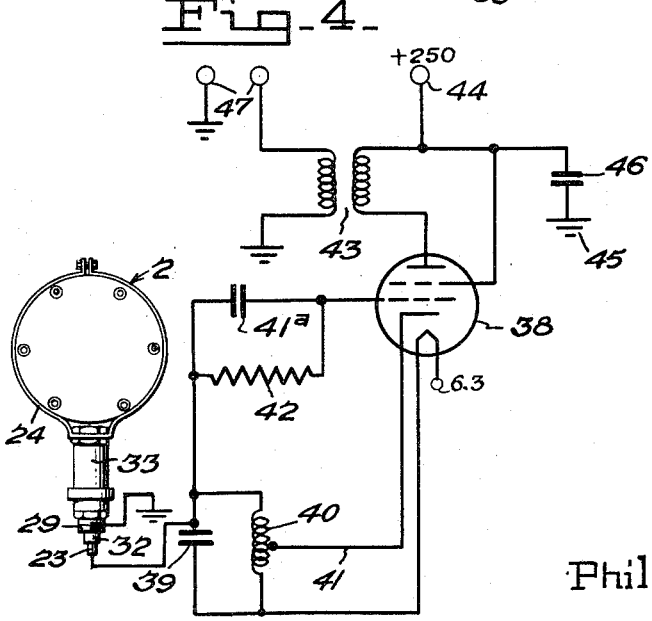
Inventor
Phil H. Weiss
By J. H. Church & H. C. Thibodeau
Attorneys Aug. 22, 1950  P. H. WEISS  2,519,421
APPARATUS FOR MEASURING BLAST PRESSURES
Filed July 23, 1945  4 Sheets-Sheet 3

Inventor
Phil H. Weiss
By J. H. Church & H. E. Thibodeau
Attorneys

Aug. 22, 1950          P. H. WEISS          2,519,421
APPARATUS FOR MEASURING BLAST PRESSURES
Filed July 23, 1945          4 Sheets-Sheet 4

Inventor
Phil H. Weiss
By J. H. Church & H. E. Thibodeau
Attorneys

Patented Aug. 22, 1950

2,519,421

UNITED STATES PATENT OFFICE 2,519,421

APPARATUS FOR MEASURING BLAST PRESSURES

Phil H. Weiss, Aberdeen, Md.

Application July 23, 1945, Serial No. 606,695

1 Claim. (Cl. 73—35)

(Granted under the act of March 3, 1883, as amended April 30, 1928; 370 O. G. 757)

The invention described herein may be manufactured and used by or for the Government for governmental purposes without the payment to me of any royalty thereon.

This invention relates to apparatus for measuring and testing the effects of blasts such as those produced by bombs. In testing the effectiveness of various types of bombs using various kinds of explosives, it is highly desirable to obtain a complete time-pressure curve of the blast of each bomb at selected points within the area of the explosion. The factors of particular interest that enable determination of the relative effectiveness of the types of bombs and explosives tested are (1) peak pressure, (2) duration of positive pressure and (3) total impulse of the positive pressure phase of the explosion. Factor (3) is of especial importance since impulse is commonly taken as a criterion of the effectiveness of a bomb within its area of damage. Any instrument of the type mentioned, to be acceptable, must therefore measure the impulse with sufficient accuracy to enable comparison between the different types of explosives tested and various methods of bomb loading. To establish a significant difference of the order of 10%, a standard deviation of the mean, of about 3% is required.

Furthermore, because of the particularly severe ground shock, shock waves, flying bomb fragments and other factors inevitable with the blast accompanying large quantities of high explosives, the instrument used must be relatively free from microphonic noise and cable signal and must be mechanically rugged and weather-proof. Low impedance in the connecting lines is also desirable and the significant records afforded should be capable of simple and direct evaluation and interpretation.

It is therefore, an object of the invention to provide a blast pressure measuring instrument whose blast or pressure-sensitive element is extremely rugged and weather-proof.

Another object is to provide a pressure-responsive instrument having its more sensitive calibrated and comparing components located remote from and protected from the effects of the blasts.

A further object is to provide an instrument giving a permanent record of the blast effects of each bomb tested whereby the effectiveness of each type of bomb, loading and explosive may be evaluated and compared so that the most desirable bomb for its intended purpose may be selected.

A still further object is to provide an apparatus for blast pressure measurements of the electrical types whose indications depend only upon characteristics of the sensitive element itself and one tuned circuit, so that changes in voltages, line impedances, amplifier characteristics, time constants, cable signal, tube microphonics, etc., have no effect upon the results.

Another object is to provide a pressure-determining apparatus wherein the frequency of a tuned circuit is modulated by and in accordance with instantaneous values of pressure to be determined which frequency is in turn used to create a sensum record whereon a sensible frequency may be determined bearing a known or determinable relation to said pressure.

A further object is to provide an instrument giving an output voltage directly proportional to the pressure created by a bomb explosion at a point relatively close to said explosion.

A still further object is to provide an instrument for testing and comparing the relative effectiveness of different types of bombs using different types of explosives wherein the more sensitive portions of the instrument may be located at locations remote from the site of the explosion.

Another object is to provide an apparatus for testing the absolute and relative effectiveness of bombs that is relatively simple, rugged, and reliable in operation.

Figure 7:
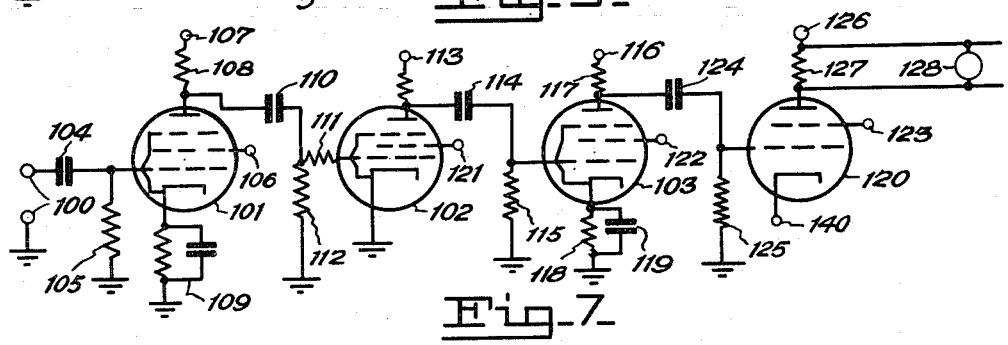
Figure 8:
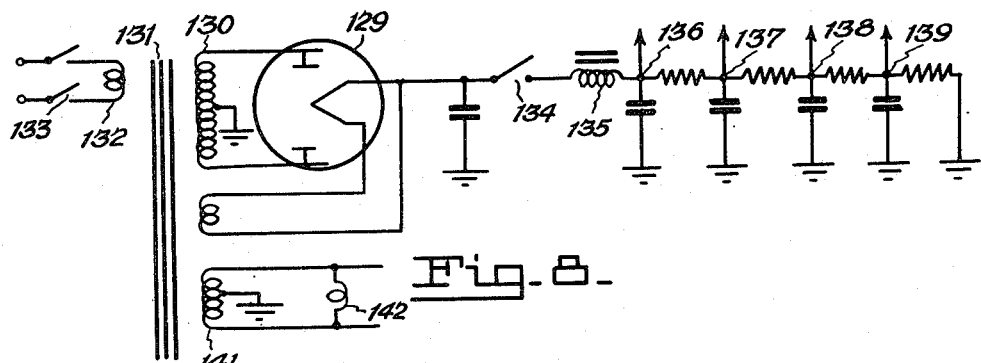
Figure 9:
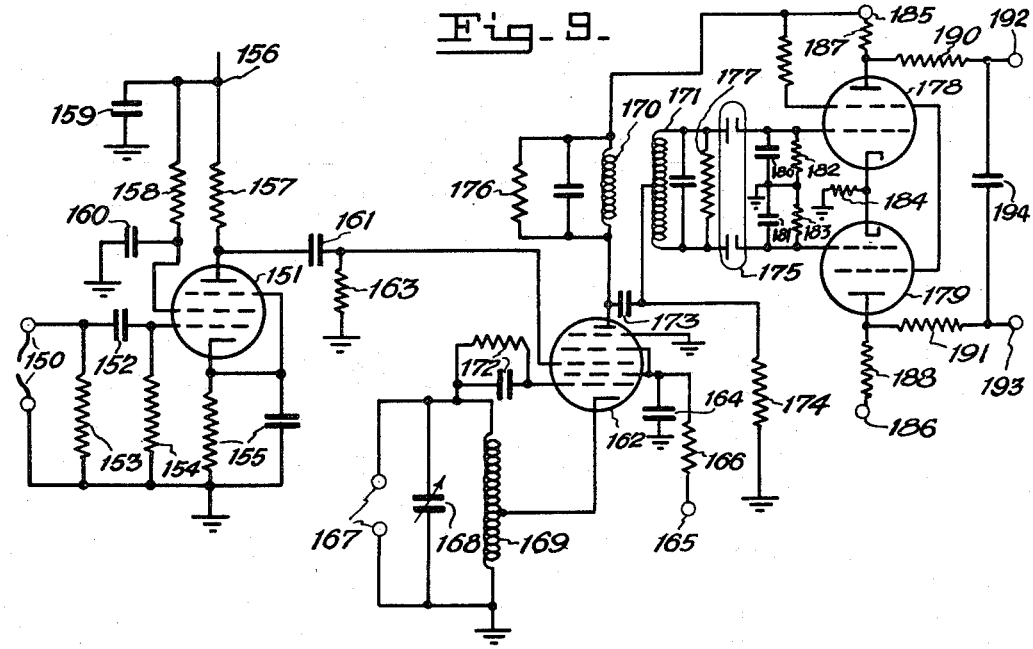
Figure 10:
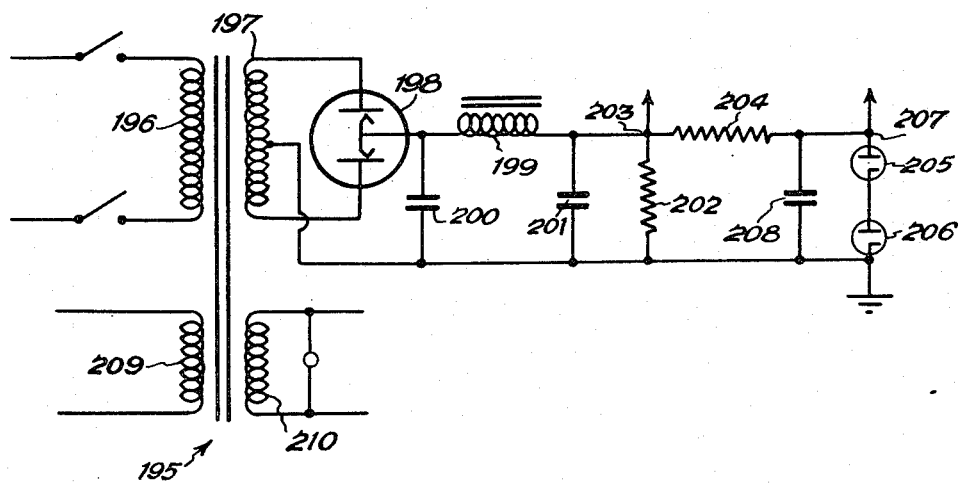

In the drawings:

Fig. 1 is a schematic view showing the general field set-up and arrangement of the various component parts of the instrument, Fig. 2 is an elevation, partly in section, showing a pressure-sensitive condenser whose capacity is directly responsive to the changes in pressure within the blast area, Fig. 3 is a section taken upon the line 3—3, Fig. 2, and showing the main condenser parts in axially-separated relation, the clamping ring and screws being omitted for greater clarity, Fig. 4 is a diagram of the transmitter circuit including the condenser and its electron-coupled oscillator, Fig. 5 is a wiring diagram of the circuit for the receiver and showing a radio-frequency stage of amplification, a local oscillator and mixer, and an audio-frequency stage of amplification, Fig. 6 is a wiring diagram showing the power supply circuit for the receiver of Fig. 5, Fig. 7 is a wiring diagram showing the circuit for sharpening the audio-frequency input from Fig. 5 whereby a neon lamp may be caused to flash sharply at the same frequency, Fig. 8 is a wiring diagram of the power supply for the flashing circuit of Fig. 7, Fig. 9 is a wiring diagram of a discriminator circuit that may be employed to check the response of the gages by coupling the output to an oscillograph, Fig. 10 is a wiring diagram of the power supply for the circuit of Fig. 9, and Fig. 11 is a view showing a section of film depicting the records of a bomb explosion as made by a number of neon lamps, together with time-constant records.

The system in general

Referring to Fig. 1, the numeral 1 indicates the general open field location of a bomb to be tested. Transmitters 2, subsequently to be described, are suspended about five feet from the ground, by ropes secured to wooden framework. The transmitters are uniformly positioned as shown, at selected, substantially equal distances from the bomb location and are protected from bomb fragments by sections of one-inch armor plate suspended between each transmitter and the bomb.

Wiring sets 3 extend from each transmitter to a corresponding receiver 5 located in a bomb-proof shelter indicated generally by the numeral 4, and located several hundreds of feet from the bomb location. Each set may consist of two twisted pairs laid in open ditches extending circumferentially about the bomb position. One pair is for filament current from a source indicated generally at 8 and for high voltage currents from a source indicated generally at 9, and may consist of #14 rubber-covered steel wire. The other pair is for radio frequency and ground return, and may consist of # 14 rubber-covered copper telephone wire. Each receiver includes a beat frequency oscillator having an audio-frequency output signal whose frequency is proportional to the instantaneous pressure upon the condenser-microphone.

From the receivers 5, connections 6 lead to flash light circuits 7 in a camera room indicated in general by the dotted lines 10, and output connections 11 extend from each circuit 7 to a respective neon flash lamp 12. All lamps are mounted within the optical field of a single motion picture camera 13. Each flash circuit incorporates a pulse-sharpening circuit which flashes its lamp at the same audio-frequency.

Thus each transmitter 2 is connected to be frequency modulated by its pressure-sensitive condenser-microphone, so that, during the blast period, the output frequency is proportional to the blast pressure at the location of the transmitter. The radio signal is conveyed to the receiver where heterodyne circuits produce an audio-frequency output also proportional to the instantaneous blast pressure upon the microphone. After sharpening, the pulses cause the respective lamps to flash and the resulting film record appears as a series of dots whose spacing is proportional to the blast pressure. One or more rows of time constant dots are also photographed upon the film as an aid in determining absolute values of instantaneous pressure. Any convenient cycles may be used to create this time record and in one test, 540 and 1000 cycle time marks were employed.

The condenser-microphone pressure gage

Figs. 2 and 3 show one form that the pressure-responsive condenser may take, wherein 14 indicates a cylindrical steel block. In an instrument actually built and tested, a block of a diameter of one inch and one-fourth inch in thickness, was found to give very satisfactory results. Block 14 fits within the ring 15 of Bakelite or other suitable dielectric having the same thickness as block 14. A pair of dielectric discs 16 and 17, of the same diameter as the outer diameter of ring 15, are superposed over respective opposite sides of the block 14 and ring 15, and over these are superposed a pair of circular steel plates 18 and 19. The dimensions and materials used may vary widely in accordance with the desired constants and range of sensitivity of the instrument and the specific conditions of use. Merely as one example of a practical model, therefore, discs 16 and 17 may be cut from sheets of polystyrene about .003" in thickness, while plates 18 and 19 may be .05" in thickness with a diameter for the ring, plates and discs of about 2½".

A series of circumferentially spaced holes are drilled through the ring 15, discs 16 and 17, and plates 18 and 19, and bolts 21 are passed through these holes to clamp the unit thus formed firmly together, after which a radial hole 22 is drilled in ring 15 and block 14 to substantially the central axis of the block and of a size to snugly accommodate a steel rod 23. A metal clamping band 24 is shaped as shown at Fig. 2 to surround the condenser unit comprising the parts 14 to 19, inc., and is firmly clamped thereabout by tightening a screw 25 passing through apertures in the ears 26 and 27. The lower portion of band 24 is offset as at 28 and has an aperture to accommodate a brass nipple 29 threaded at its top and secured in place by nuts 30 and 31 threaded thereon upon opposite sides of offset 28. A tube 32 of methyl-methacrylate or 'Lucite" fits within nipple 29 and acts to insulate steel rod 23 from said nipple. A male microphone connector 33 snugly surrounds nipple 29. From Fig. 2, it will be observed that rod 23 acts as a connector for block 14 and extends below the end of "Lucite" rod 32 so that, when the parts are inserted into a standard microphone receptacle, the condenser formed by block 14 on the one hand, and steel plates 18 and 19 on the other are connected into the circuit by connectors in the receptacle making contact with rod 23 and nipple 29, respectively. The lower end of nipple 29 is threaded and a nut 34 threaded thereon holds connector 33 in place. The threaded portion also affords a connection by which the microphone may be rigidly secured in place in its receptacle. After assembly, the gage is dipped in ethyl cellulose stripping compound which forms a tough elastic coating for the exposed parts of the instrument and render it unaffected by rapid changes in temperature and humidity. The plastic coating also presents a good aerodynamic surface to the blast waves.

The transmitter

The transmitter tube and its connected electrical elements are mounted within a case formed of steel plates of approximately one-half inch in thickness and are supported in said case upon a base carried by soft rubber mounts. The pressure-sensitive gage itself is screwed into its receptacle so as to project from the top of the case and is so positioned as to be edge on to the bomb location. As an example of the compact arrangement possible, one model of transmitter found to give excellent results, had a case about 7" x 7" x 5" in exterior dimensions and weighed about 50 pounds.

As indicated in Fig. 4, the transmitter comprises an oscillator tube 38 such as a 6V6 having its grid circuit in series with the plate elements 18, 19 and 14, respectively, of pressure gage 2. A by-pass condenser 39 and tuning inductance 40 are shunted across the terminals of the gage. Inductance 40 is direct connected to the heater cathode by a tapped connection 41. In the model selected for illustration, the capacitance of 39 and 41a may be 250 mmf., each, inductance 40 may consist of a total of 80 turns. Biasing resistor 42 may have a value of approximately 20,000 ohms. The plate circuit is inductively coupled to the output through a secondary of 50 turns, the value of inductance 43 being 2.5 mh. A plate supply of 250 volts is connected at 44 and applied directly to the screen and to the plate through the primary of 43. Ground connection is made at 45 through a capacitance 46 of .01 mf. Standard filament voltage of 6.3 is used. The output terminals are indicated at 47.

The transmitter frequency is closely approximated by the equation, $$F = \frac{1}{2\pi\sqrt{LC}}$$

where F is the frequency of oscillation, L is the tuning inductance, C is the total tuning capacity. Differentiating the foregoing equation we obtain $$dF = \frac{-F}{2C} dC$$

where $dC$ is the change in capacity of the gage necessary to effect a corresponding change in frequency $dF$.

The frequency is adjusted by varying the tuning inductance 40. For best operation it has been found that the frequency should be between 500 kc. and 3000 kc. The higher the frequency the greater the sensitivity of the instrument. For stable operation, the tuning capacity should have as high a value as is consistent with adequate sensitivity which decreases as the capacity is increased. By receiving a harmonic of the transmitter frequency the sensitivity can be increased several times but with a consequent loss in stability. The range of change in capacity is, of course, dependent upon the constants of the gage 2. For example a stiffer diaphragm 18 and 19 results in less sensitivity but a greater linear range. A thinner dielectric 16 and 17 gives added sensitivity but may result in breakdown in case the discs are made too thin.

The foregoing matters are discussed in order to show that the factors governing the constants of an instrument depend upon the particular quality or qualities desired to be emphasized in that particular instrument, and to show that such constants may be varied widely without in any way changing the basic principles underlying the invention. The specific values selected will usually represent a compromise between sensitivity, stability in operation, and sturdiness of construction. The particular values identified in connection with Fig. 4 thus represent but one of the many combinations of values capable of giving satisfactory results and is wholly free from microphonics over the sensitivity range used.

The operation of the transmitter will now be clear. As the external pressure effective upon the gage changes as a result of the wave resulting from a bomb explosion, the capacity thereof is correspondingly altered. This change in capacity results in a linear change in the frequency of output of the transmitter. The output signals are then conveyed to the receiver located in the bombproof and treated in a manner subsequently to be explained.

The receiver

A receiver (Fig. 5) giving satisfactory results in the model selected for description, includes a single stage of R. F. amplification using a pentode 48 such as the 6AC7. In the subsequent description of the receiver circuit, unless otherwise stated, each condenser unit may be taken to have a capacitance of .01 mmf.

The input terminals 49 are connected by wiring 3 to the corresponding output terminals 47 of the transmitter, Fig. 4. One terminal 49 is connected by a line 71 to the cathode of tube 48 through a resistor 50 having a value of 0.15 megohm, and to the suppressor through condenser 51. The grid circuit includes resistors 52 and 53 having values of 0.15 and 0.1 megohm, respectively. Condenser unit 54 may have a value of .0001 mmf. Screen and plate resistors 55 and 56 having values of 100,000 and 10,000 ohms respectively, are connected to supply tap 66 at 350 v. The screen is grounded through a condenser 55a.

The oscillator and mixer tube 57 is a multi-electrode pentode such as the 6SA7. Grid #1 is connected to one terminal 49 through a set of variable condensers 58 and 59 and a third variable condenser, not shown, that is connected to terminals 60 brought out to the front panel so that the proper value of condenser may be inserted into the last circuit of the oscillator grid. All said condensers, together with inductor 61 of about 80 turns, are connected in parallel in the grid circuit and are in series with a condenser 62 of .00025 mmf. and resistor 63 of 20,000 ohms. The heater cathode of the tube 57 is tapped to inductor 61 in a ratio that may be 5 to 3. Grid #3 is connected to the plate of tube 48 through a condenser 64 of .0001 mmf. and the connection is grounded through a resistor 65 having a value of 0.1 megohm.

The plate of tube 57 is connected by lead 68 with supply tap 66, through a resistor 69 of 50,000 ohms. This lead is grounded at 67 through a condenser 70 and the plate is connected to ground through a condenser 79. Grid #2 and grid #4 of tube 57 are connected to lead 72 between a resistor 73 having a value of 20,000 ohms and a condenser 74 of .2 mmf. Thus the amplified R. F. signals from tube 48 are heterodyned with the oscillations of tube 57 to produce an A. F. output signal that can be easily adjusted by tuning and that can be monitored with a loud speaker or an oscillograph. For reasons that will subsequently be explained, the beat frequency is adjusted to 1500 or 2000 cycles.

A single stage of A. F. amplification is used and includes a tube 75 such as a 6V6 having its cathode connected to input line 71 through a capacitance 76 of 40 mmf. and a resistor 77 of .3 megohm. The grid of tube 75 is connected to the plate of tube 57, through a condenser 78 and to ground through a resistor 80. The plate and screen of tube 75 are connected to lead 68 through resistors 81 and 82, having values of 5,000 and 100,000 ohms, respectively. The screen is also grounded through a condenser 83 of .5 mmf. The output terminals are indicated at 84 and are shunted by a condenser 85. One terminal is directly connected to line 71 while the other is connected with the plate of tube 75 through a condenser 86 of 1 mmf.

At Fig. 6 I have shown a current supply circuit suitable for use with the receiver shown in Fig. 5. A full wave rectifier 87 has its anodes connected to the end taps of the secondary 88 of a transformer 89. The primary 90 is adapted to be connected through switch 91, with a standard 115 v. source of A. C. The single section, condenser input filter with center tap connection, is well known in the art and need not be described in detail. It is deemed sufficient merely to identify condensers 92 and 93, inductance 94 and bleeder 95. One output terminal 96 is grounded and the other, 97, is connected to terminal 66 to give a positive potential at said terminal of 350 v. The transformer has additional secondary windings such as 98 and 99 for supplying filament voltages.

The flashing circuit

The circuit for peaking the A. F. signals from the receiver, to flash the neon lamp, is shown at Fig. 7, and includes input terminals 100 which, it will be understood, are connected with receiver output terminals 84. Three triple grid tubes 101, 102 and 103, such as the 6SJ7, are used with suppressor operating as class $A_1$ amplifiers direct connected to cathode at the socket. The screen or grid #2 of each of tubes 101, 102 and 103 is supplied with voltage at 120 v.

Grid #1 of tube 101 is connected to ground through a resistor 105 having a value of 1 megohm. Its plate circuit includes a terminal 107 supplied at 400 v. and connected to the plate through a resistor 108 of 0.1 megohm. The plate circuit is completed to ground through a tank 109 having values of 2,000 ohms and 10 mf.

The grid of tube 102 is connected to the plate of tube 101 and resistor 111 of 4 mg. The connection is grounded at a point between 110 and 111 through a resistor 112 of 4 megohms. The plate circuit includes a terminal 113 supplied at 30 v. through a resistor of 50,000 ohms, the cathode being directly connected to ground.

The plate of tube 102 is connected with the grid of tube 103 through a condenser 114 having a capacity of .00005 mf. and the grid is grounded through a resistor 115 of 50,000 ohms. The plate circuit includes a terminal 116 connected to the 400 v. tap of the current supply and to the plate itself through a resistor 117 of 25,000 ohms. The cathode is grounded through units 118 and 119 of 0.5 megohm and .001 mf. respectively. A final stage of amplification is employed, using a beam power tube 120 such as the 6V6 having its grid connected to the plate of tube 103 through a condenser 124 of .001 mf. capacity and to the ground through a resistor 125 of 0.1 megohm. Screen terminal 123 is supplied at 400 v. The plate circuit includes a terminal 126 at 400 v. and a resistor 127 of 10,000 ohms. As shown, the lamp 128 of 0.1 watt is connected to opposite terminals of resistor 127. The pulses supplied are of a few microseconds' duration and cause the lamp to flash sharply at the input frequency over a range of 500 to 20,000 cycles.

Each light is mounted behind a mask having a narrow slit to give a sharply defined point of light upon the film. The film moves continuously and one or more time records are simultaneously recorded thereon as by flashing a corresponding number of lamps from a source of known frequency, such as a 1000 cycle standard.

The current supply for the flashing circuits is shown at Fig. 8 and may include a condenser input filter using a full-wave high-vacuum rectifier 129, such as the 5Y3G having its anodes connected to the ends of the secondary 130 of transformer 131 and having a grounded center tap. The primary 132 is connected through switch 133 with a standard 110 volt source of A. C. The supply taps are connected through a switch 134 provided so that the lamps may be switched off except for the relatively short period during which records are being made, to thereby extend the life of the lamps. A choke 135 is used between the cathode and first tap 136. The several taps 136, 137, 138, and 139 are designed to supply voltages of 400, 120, 100, and 30, respectively. Thus tap 136 may be connected to terminals 107, 116, 126, and 123, Fig. 7 and tap 137 may be connected to terminals 106, 121 and 122. Tap 138 is connected to supply terminal 140 and tap 139 supplies current to terminal 113. Filament current is supplied at standard 6.3 voltage by a secondary 141 having a grounded center tap.

Operation

In operation, the tuning condensers in each transmitter are adjusted so that the frequencies of the transmitters vary in steps of more than 10 kc. The purpose of this adjustment is to prevent interference between signals. Satisfactory transmission of the signals over lines 2000 feet long is thus obtainable when desired. The output frequency of each receiver is monitored by means of a cathode-ray oscillograph and a calibrated audio-frequency oscillator. Each local oscillator is adjusted to an optimum frequency of about 1500 cycles above the corresponding transmitter frequency to give a desired optimum beat frequency. This optimum frequency is governed only by the limitations that the flashing lights do not operate satisfactorily below 500 cycles while the film record is difficult to read at frequencies above 10,000 cycles.

The transmitter and receiver circuits are closed about one hour before a test, in order to allow the R. F. oscillators to come to equilibrium. Last minute frequency adjustments are made immediately before the bomb is exploded and the flashing lights are turned on at switch 134 and the camera started, just prior to the explosion.

The resulting record is shown at Fig. 11 where the four upper rows of dots 143 on film 144, represent the flashes of the lights controlled by the respective transmitters, while the two lower rows of dots 145 and 146 are those made by lamps flashing at known frequencies such as 350 and 1000 cycles, respectively. Thus the number of dots in any of the four upper rows per unit time as determined by one or both of the lower rows of dots, is proportional to the pressure effective upon the transmitter due to the bomb blast.

Calibration

In order to interpret the number of dots corresponding to unit time as recorded upon the film, it is necessary to provide a calibration chart for the instrument. This is done by placing each gauge within a tank and subjecting the same to known pressures measured by a mercury manometer while simultaneously measuring the corresponding frequency at the receiver by means of a calibrated audio oscillator and an oscillograph.

The number of pressure levels used in calibration is arbitrarily selected and, of course, should cover the entire range of pressures encountered in actual bomb tests. Four, substantially equally-spaced pressures over the necessary range, is usually sufficient. Assume that $$f = f_0 + kP \tag{1}$$

where $f$ is the frequency of the neon lamp as depicted upon the film record; $f_0$ is the normal or standard atmospheric pressure frequency of the neon lamp; P is the gage pressure; and $k$ is a sensitivity factor. Then, integrating, $$\int_0^T f\,dt = f_0 T + k \int_0^T p\,dt \tag{2}$$

where T is any elapsed time, usually taken as the time of the positive-pressure phase of the explosion. In Equation 2, the numerical value of the left-hand side is the total number of flashes that have occurred up to time T. This number is taken directly from the film; $f_0$T is the total number of flashes that would have occurred in the same time in the absence of a bomb explosion and is determined by measuring $f_0$ and T on the film. Since only the product $f_0$T is required, the values of $f_0$ and T can be measured in arbitrary units. The final term of Equation 2 is the desired impulse up to time T, which may now be determined when "$k$" is known. No calibration is necessary in order to determine relative impulse values set up by various bombs tested. It is within the purview of my invention to count the flashes electronically so as to give the pressures directly, without photographing light flashes and without reading film.

Table 1 shows a sample calibration wherein $f_0$ is the standard A. F. frequency before pressure is applied; $f$, is the frequency corresponding to gage pressures giving the readings $p_1$ and $p_2$ in the two manometer columns. The value of "$k$" can now be computed by $(f-f_0)/(p_1-p_2)$.

Table 1

| $f_0$ | $f$ | $p_1$ | $p_2$ |
|---|---|---|---|
| 1,000 | 5,900 | 36.0 | 19.15 |
| 1,000 | 4,700 | 34.0 | 21.1 |
| 1,000 | 3,650 | 32.2 | 22.95 |
| 1,000 | 2,550 | 30.3 | 24.9 |
| 1,000 | 1,000 | 27.7 | 27.6 |

Table 2 gives the results of tests on a number of general purpose bombs of 2000 lbs. each, at 205 feet.

Table 2

| Explosive | Observations | Average Impulse (Milsec. p. s. i.) | Standard Deviation of mean, Percent |
|---|---|---|---|
| TNT | 10 | 33.1 | 2.2 |
| Amotol | 8 | 28.9 | 3.1 |
| RDX Comp B | 11 | 35.9 | 1.9 |
| Torpex | 11 | 42.0 | 1.2 |
| Minol | 11 | 39.9 | 1.2 |
| DBX | 10 | 41.8 | 1.5 |
| Ednatol | 10 | 34.3 | 0.9 |
| German (1000 kg.) | 6 | 33.1 | 2.0 |

*The discriminator*

The discriminator circuit shown at Fig. 9 is used to provide a record upon the film that serves as a check upon the response of the gages. This circuit includes input terminals 150 in the grid circuit of a tube 151 such as the pentode 6AC7. Said circuit includes a condenser 152 of .0001 mf. capacity and shunt-connected resistors 153 and 154 of 0.15 and 0.1 megohm, respectively. The cathode of tube 151 is directly connected to the suppressor and to the other input terminal through a tank 155 having values of 150 and .01 mf. A terminal 156 at +350 v. is connected to the plate through a resistor 157 of 10,000 ohms while the grid is connected with terminal 156 through a resistor 158 connected to ground through condensers 159 and 160 of .01 mf. each.

The plate of tube 151 is connected to grid #3 of an oscillator and mixer tube 162, through a condenser 161 of .0001 mf. capacity. Said grid is connected to ground through a resistor 163 of 0.1 megohm. Tube 162 may be a 6SA7 pentagrid having grid #5 directly connected to ground and grids #2 and #4 connected to ground through a condenser 164 of .2 mf. and to a supply terminal 165 at +300 v. through a resistor 166 of 20,000 ohms. The circuit to grid #1 includes terminals 167 adapted to be connected with a tuning condenser, not shown, a condenser 168 and an inductor 169 of about 80 turns. These elements are connected in parallel to ground, as shown, and their remaining terminal is connected to the grid through a tank 172 having values of 20,000 ohms and 250 mf.

The plate of tube 162 is connected to one terminal of the primary 170 of a transformer whose secondary is indicated at 171. This transformer forms a part of a Foster-Seeley discriminator stage and consists of three separate honeycomb coils ⅜" thick on ½" coil forms, using 300 turns of #28 wire for each coil. The three coils are mounted side by side upon the same shaft with coil 170 in the center and the two outside coils connected in series to form the center-tapped secondary. This center tap is connected to the plate of tube 162 through a condenser 173 of .002 mf. and to ground through a resistor 174 of 15,000 ohms.

A twin diode 175 such as the 6H6, has its cathodes directly connected to the ends of secondary 171. Both primary 170 and secondary 171, are shunted by resistors 176 and 177 such as will give a band width of 15 kc. The plates of diode 175, are connected to the grids of a pair of amplifier tubes 178 and 179 connected in push-pull relation. These tubes may be of the standard 6V6 type connected in a network as shown where condensers 180 and 181 have a value of .001 mf. each, and resistors 182 and 183, 0.1 megohm each. The cathodes are grounded through a resistor 184 of 2,000 ohms. Plate voltages of 300 are supplied at terminals 185 and 186 which terminals are connected to the plates of the respective tubes 178 and 179 through resistors 187 and 188 of 20,000 ohms each. The screens of the tubes are supplied through resistor 189 having a value of 0.1 megohm. Terminal 185 is directly connected with one terminal of primary coil 170. The plates are connected through resistors 190 and 191 to output terminals 192 and 193. These resistors may be 50,000 ohms each. The output terminals are connected through a condenser 194 of .0003 mf.

Fig. 10 shows a voltage supply for the discriminator circuit and includes a transformer 195 having its primary 196 connected to a standard 115-volt source of A. C. Transformer 195 has a secondary 197 having its terminals connected to the respective plates of a full-wave rectifier tube such as the RCA 80. Inasmuch as such supply circuits are well known, it is deemed unnecessary to describe the remaining elements in detail. It is considered sufficient merely to identify smoother 199, condensers 200 and 201, and the output network comprising resistor 202 of 40,000 ohms, 350 volt terminal 203, resistor 204 of 750, and voltage regulators 205 and 206 giving a voltage of 300 at terminal 207. Condensers 200, 201, and 208 may have values of 16 mf. each. Filament current is supplied from secondary coils 209 and 210 having the desired turn-ratio to primary 196.

In operation the primary and secondary coils 170 and 171 are both tuned to resonance in the circuit at 100 kc. above the frequency of the signals from the transmitter of Fig. 6. At this time the voltage across output terminals 192 and 193 is zero. By detuning the local oscillator circuit 7 kc. each way the output voltage may be made to vary over a range of 150 volts each way. The output voltage bears a substantially straight line relation to the pressure effective upon the condenser at the transmitter over the central two-thirds of this range so that output terminals 192 and 193 can be directly connected to the deflection plates of an oscillograph whereby a photographic record of the effects of a bomb blast as measured by the deflections of the cathode ray can be obtained. If desired, such a record may be photographed upon the same film as the neon lamp record and may then serve as a check upon the pressure values obtained from the exposed flashes of the neon lamps.

In the foregoing description, in order to comply with the requirements of the patent statutes, the arrangement, dimensions, types of tubes, electrical constants and ranges of adjustments of an instrument as actually built, tested and operated with very satisfactory results, have been explained and identified in detail. However, numerous changes, alterations and substitutions of equivalents will occur or be obvious to those skilled in the art. Furthermore, the various dimensions and electrical constants identified in connection with the several component elements of the invention will vary somewhat in keeping with the desired range of indications of the instrument being built as well as its intended purpose. Hence the description is to be taken in an illustrative sense only, and not in a limiting sense. Reservation is made of all such variations, modifications, substitutions, and alterations as fall within the scope of the subjoined claim.

Having now fully disclosed the invention what I claim as new and desire to secure by Letters Patent is:

In a gage for testing the effectiveness of bombs, a condenser having its capacity varied by and in response to changes in ambient atmospheric pressure effective thereon, an oscillator tube having a cathode, grid and plate, an input circuit including said condenser, grid and cathode, an output circuit including said plate and cathode, a heterodyne receiving circuit inductively coupled with said output circuit and having an audio frequency output, a sharpening circuit connected to said audio frequency output to peak the signals thereof, a flash lamp responsive to the output of said sharpening circuit and flashing in synchronism therewith, and a moving film camera positioned and adapted to record said flashes as a series of dots whose spacing is proportional to the instantaneous pressure on said condenser.

PHIL H. WEISS.

REFERENCES CITED

The following references are of record in the file of this patent:

UNITED STATES PATENTS

| Number | Name | Date |
|---|---|---|
| 2,001,096 | Flanders | May 14, 1935 |
| 2,113,011 | White | Apr. 5, 1938 |
| 2,167,630 | Bazzoni et al. | Aug. 1, 1939 |
| 2,178,471 | De Bruin | Oct. 31, 1939 |
| 2,225,668 | Subkow et al. | Dec. 24, 1940 |
| 2,291,045 | Lancor | July 28, 1942 |
| 2,340,714 | Traver | Feb. 1, 1944 |
| 2,361,634 | Koch | Oct. 31, 1944 |
| 2,367,866 | Humphreys et al. | Jan. 23, 1945 |
| 2,368,278 | Warshaw | Jan. 30, 1945 |
| 2,414,719 | Cloud | Jan. 21, 1947 |

OTHER REFERENCES

French publication, "Measures": article, "Les Applications du Quartz dans l'Industrie." Mar. 1947, p. 73.